US006250796B1

(12) United States Patent
Huang

(10) Patent No.: US 6,250,796 B1
(45) Date of Patent: Jun. 26, 2001

(54) AGITATION APPARATUS WITH STATIC MIXER OR SWIRLER MEANS

(76) Inventor: Weimin Huang, 504, No. 18, Kallu, First Village, Shanghai 200438 (CN)

(*) Notice: Subject to any disclaimer, the term of this patent is extended or adjusted under 35 U.S.C. 154(b) by 0 days.

(21) Appl. No.: 08/860,189

(22) PCT Filed: Dec. 26, 1995

(86) PCT No.: PCT/CN95/00101

§ 371 Date: Jun. 20, 1997

§ 102(e) Date: Jun. 20, 1997

(87) PCT Pub. No.: WO96/20041

PCT Pub. Date: Jul. 4, 1996

(30) Foreign Application Priority Data

Dec. 28, 1994 (CN) ................................................ 94114060

(51) Int. Cl.[7] .............................. B01F 5/06; B01F 5/10; B01F 7/22; B01F 13/02

(52) U.S. Cl. ........................ 366/270; 366/102; 366/107; 366/137; 366/147; 366/306; 366/307; 366/339; 261/93

(58) Field of Search ................................. 366/102–104, 366/107, 136, 137, 147, 164.4, 174.1, 262, 263, 265, 270, 302, 306, 307, 336–340, 349; 261/93; 422/135

(56) References Cited

U.S. PATENT DOCUMENTS

| | | | | |
|---|---|---|---|---|
| 1,351,352 | * | 8/1920 | Stevens | 366/306 |
| 1,413,724 | * | 4/1922 | Groch | 366/102 |
| 1,762,950 | * | 6/1930 | Beers | 366/302 |
| 1,768,955 | * | 7/1930 | Johnson | 366/307 |
| 1,768,956 | * | 7/1930 | Johnson | 366/302 |
| 1,768,957 | * | 7/1930 | Johnson | 366/302 |
| 2,517,743 | * | 8/1950 | Vogel | 366/102 |
| 3,973,759 | * | 8/1976 | Mizrahi et al. | 366/302 |
| 4,155,657 | * | 5/1979 | King et al. | 366/302 |
| 4,541,724 | * | 9/1985 | Cornelissen | 366/302 |
| 4,660,988 | * | 4/1987 | Hara et al. | 366/137 |
| 4,670,397 | * | 6/1987 | Wegner et al. | 366/102 |
| 4,812,045 | * | 3/1989 | Rivers | 366/137 |
| 4,951,262 | * | 8/1990 | Phillippi et al. | 366/307 |
| 5,176,447 | * | 1/1993 | Bata et al. | 366/263 |

FOREIGN PATENT DOCUMENTS

| | | | |
|---|---|---|---|
| 1033528A | | 6/1989 | (CN) . |
| 87101299.5 | * | 12/1987 | (JP) . |
| 63-31562 | * | 2/1988 | (JP) . |
| 4-22433 | * | 1/1992 | (JP) ..................... 366/307 |
| 1678429 | * | 9/1991 | (SU) ..................... 366/307 |

OTHER PUBLICATIONS

Myers et al. Avoid Agitation By Selecting Static Mixers, Jun. 1997, pp. 28–38, Chemical Engineering Progress.

McCabe et al. Unit Operations of Chemical Engineering, 3rd ed. section 2–9, pp. 228–231; 238–239; and 248–251 (1976).

J.M. Ottino, "The kinematics of mixing: Stretching, Chaos and Transport", pp. 222–223, University of Cambridge publisher (1989).

D.J. Tritton, Taylor Columns, section 16.4, "Physical Fluid Dynamics", pp. 221–222 (1977).

* cited by examiner

Primary Examiner—Charles E. Cooley
(74) Attorney, Agent, or Firm—Kenneth C. Brooks

(57) ABSTRACT

An apparatus for conducting aqueous liquid media includes a plurality of static mixers, a gas distributor assembly with a plurality of nozzles, at least one impeller having blades attached thereto and a plurality of static mixer assemblies having flow guide elbows and collectors. The static mixer assemblies are independently and separately mounted to orient to the current leaving the blade tips of the impeller. Swirlers are also described as being utilized in place of the static mixers.

22 Claims, 9 Drawing Sheets

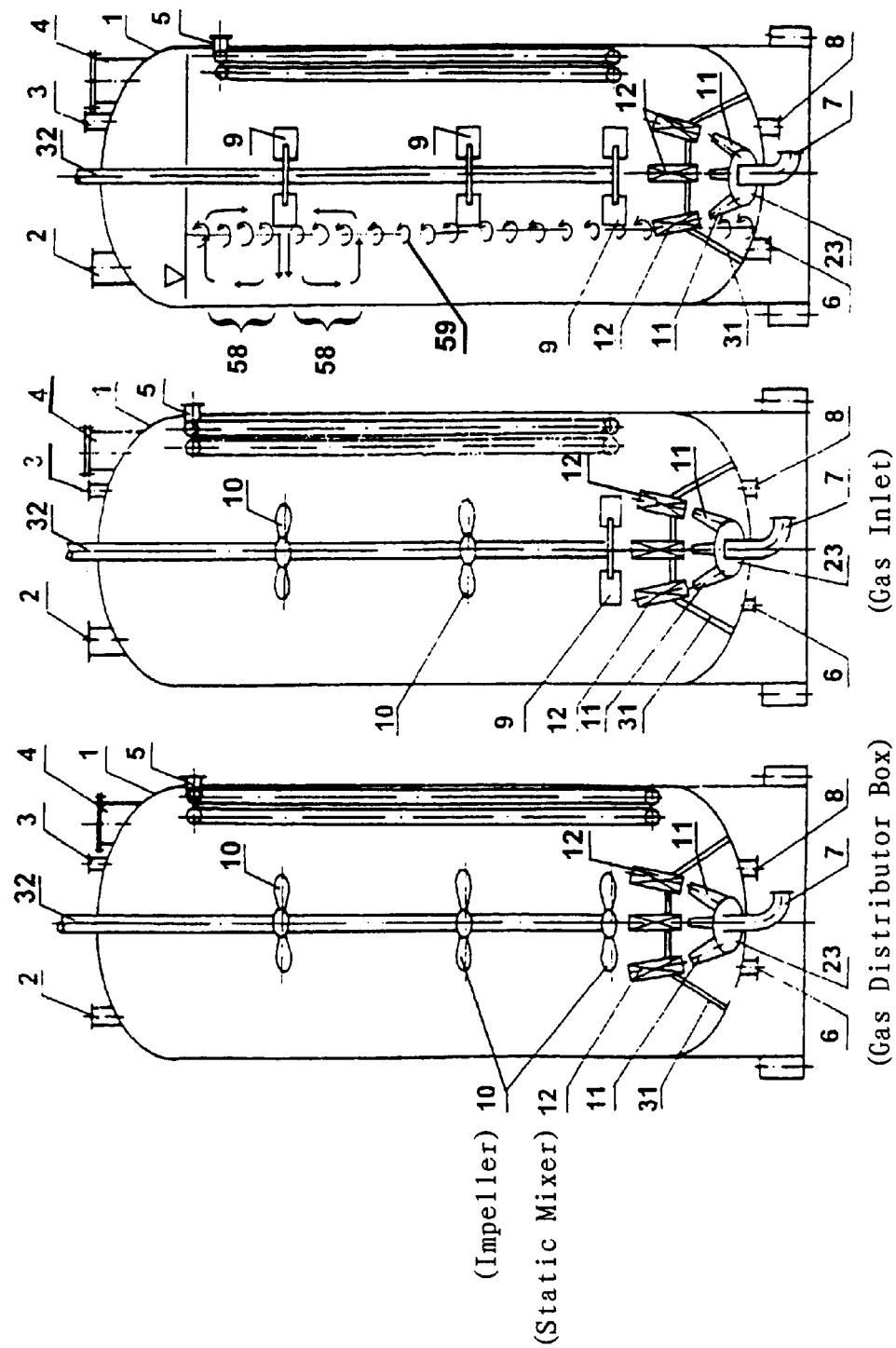

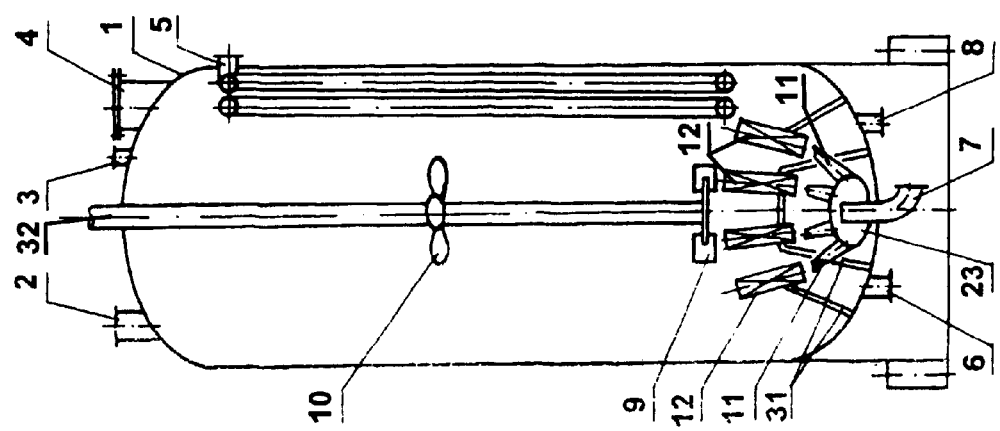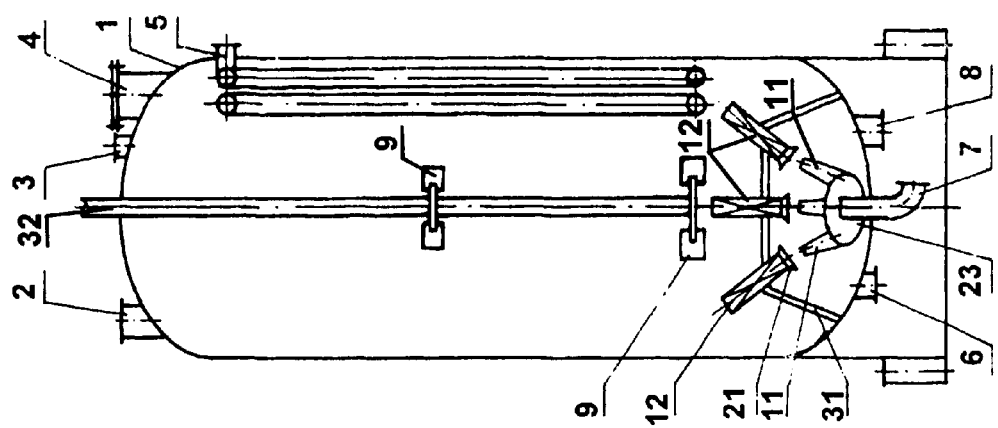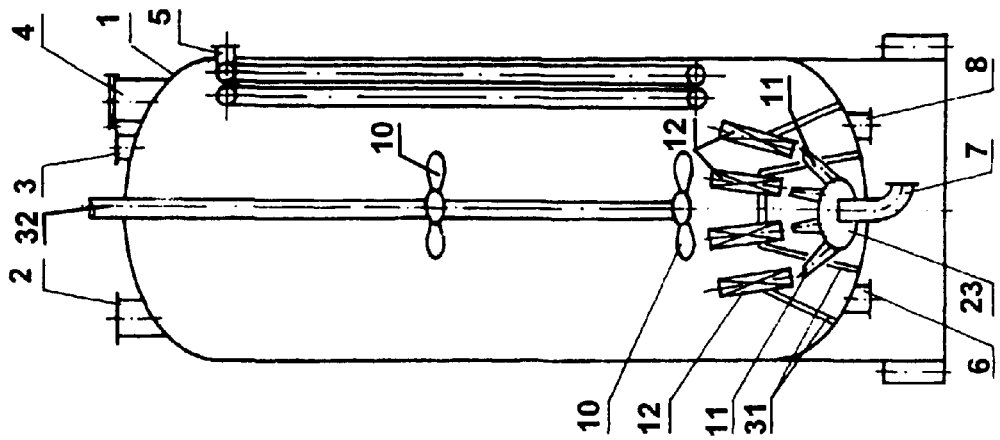

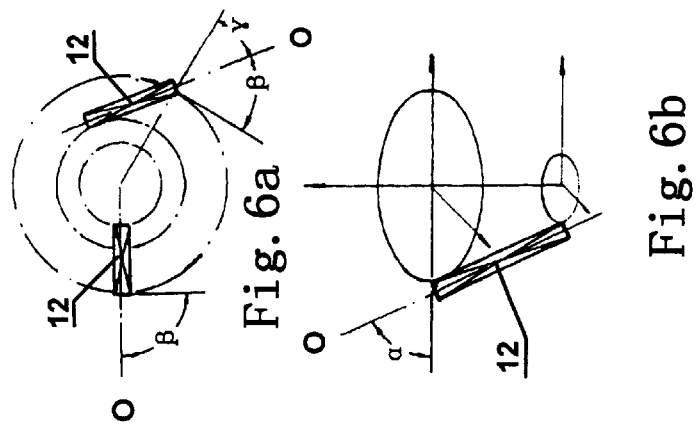
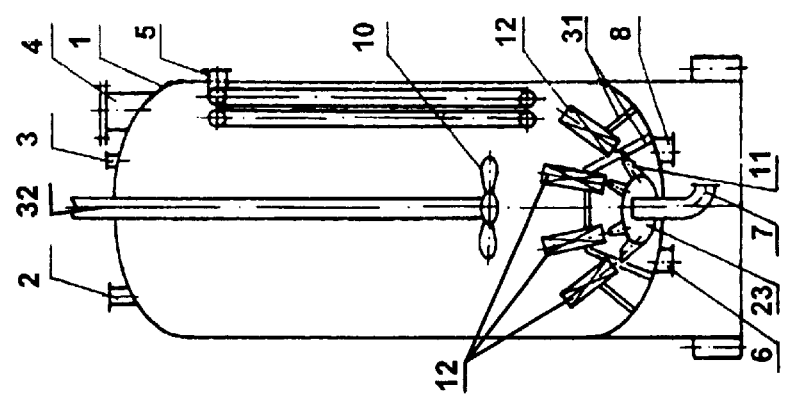
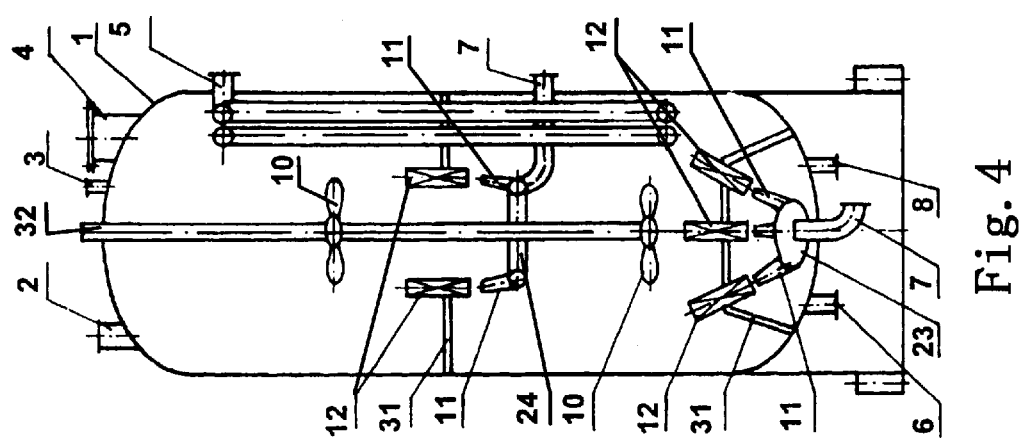

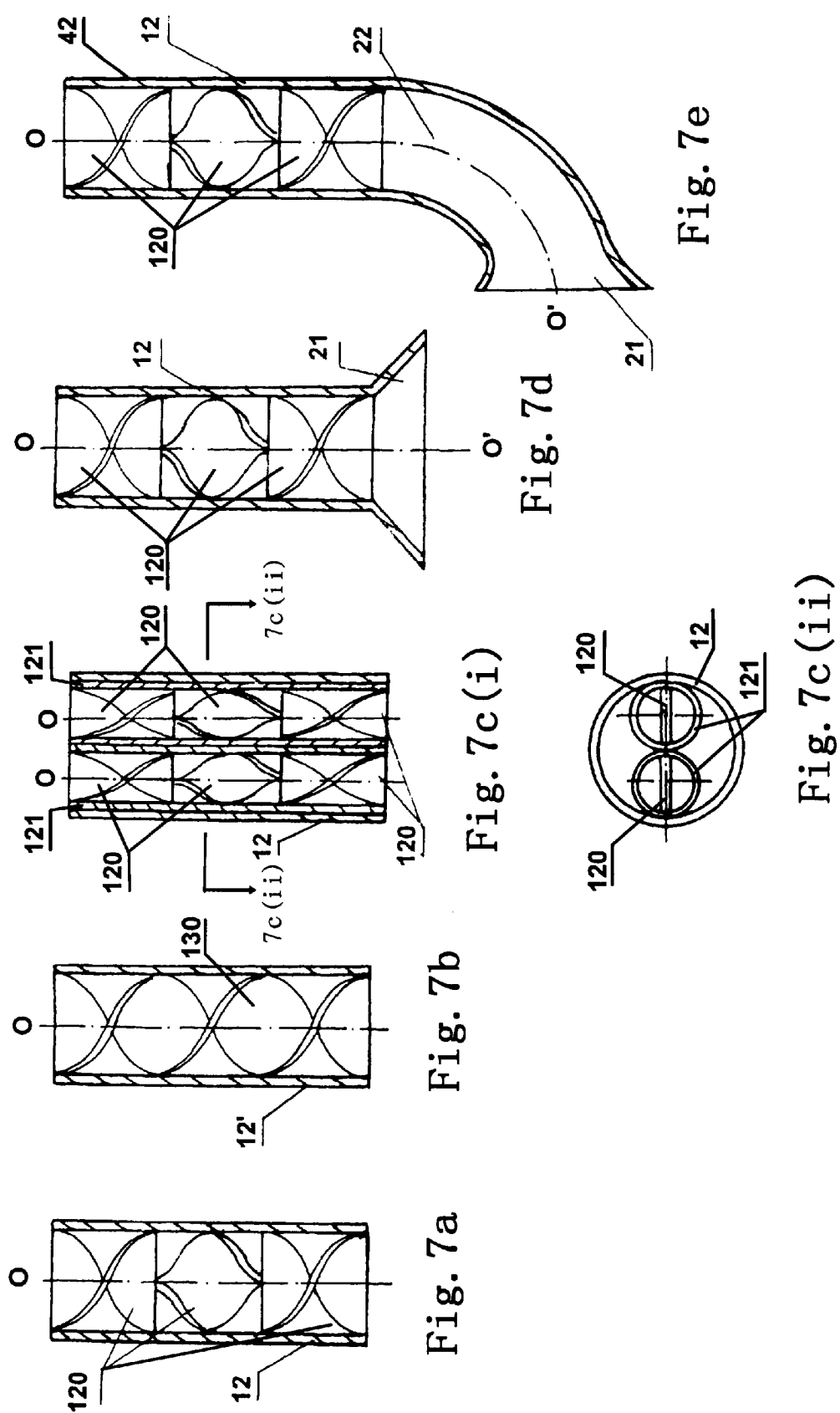

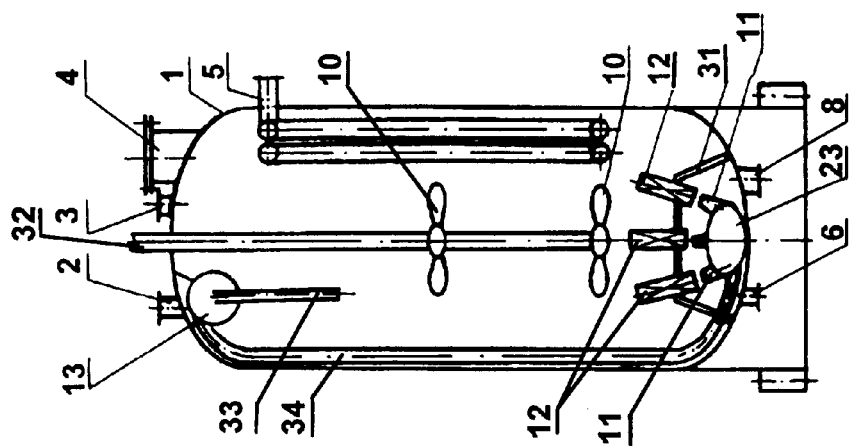
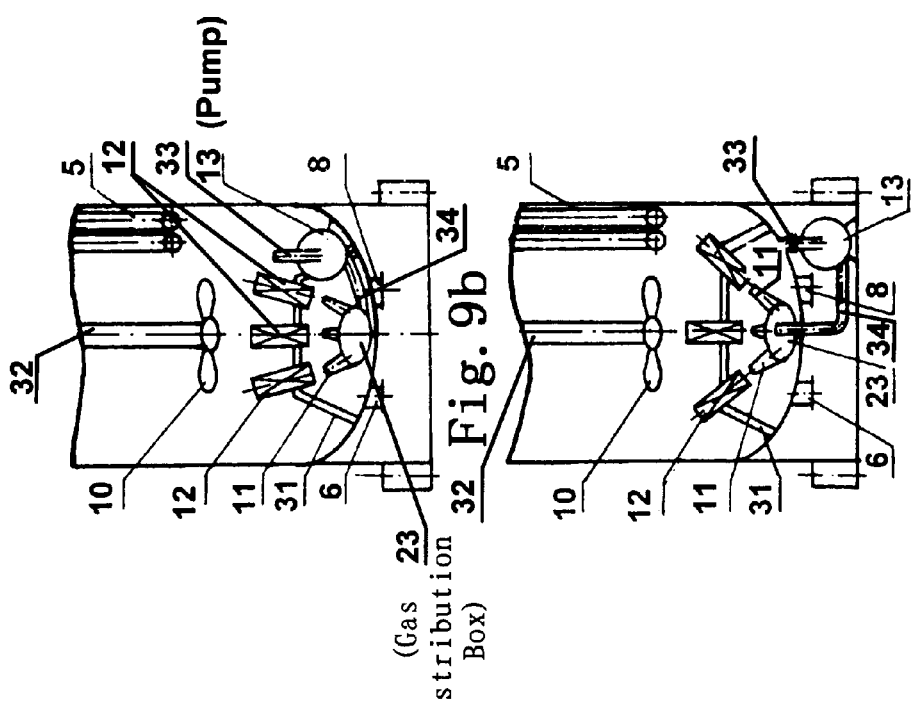
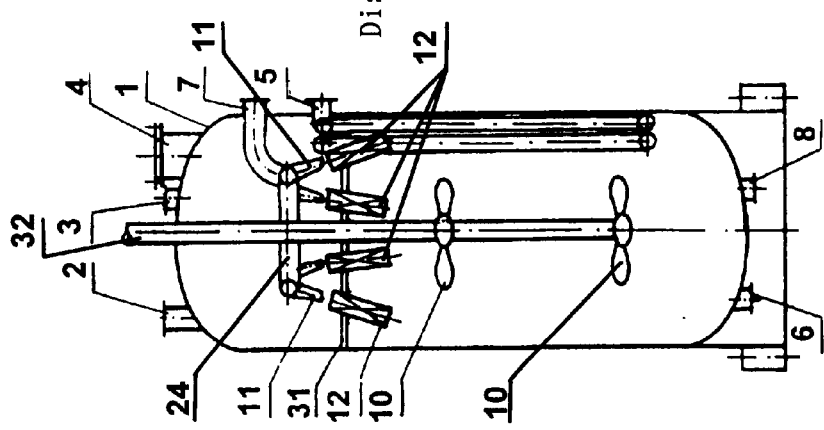

AGITATION APPARATUS WITH STATIC MIXER OR SWIRLER MEANS

FIELD OF THE INVENTION

The present invention relates to a kind of agitation apparatus which covers the agitation apparatus for dispersing gas, liquid and solid phase media in hard to mix or dissolve liquid phase to carry out mixing, extracting and dissolving operations, the agitated reactor for monophase or multiphase chemical reaction or polymerization in which the reaction rate is rather slow (controlled by diffusion) between or among media, and the agitated fermentation tank for anaerobic or aerobic bacteria fermentation during biochemical fermentation process.

The agitation apparatus is provided with a plurality of open static mixer means that is a kind of mixing apparatus in pipeline production with continuous operation.

In these aspects, the invention relates to agitation apparatuses useful for saving agitation power input, enhancing efficiency, increasing productivity, more operatively flexible, easily controlling process operation, and particularly for the retrofit of the existing agitation process apparatus.

BACKGROUND OF THE INVENTION

The agitation apparatus is an important unit operating equipment in chemical, biochemical and other engineering. Presently, agitation apparatus are generally stirred by one stage or multistage mechanical impellers to provide homogeneous mixing, dispersing, suspending and emulsifying to materials and thus to strengthen mass-transfer, heat-transfer, chemical reaction and biochemical reaction processes. However, although the impellers of conventional agitation apparatuses have been improved significantly, and disk radial turbine type, axial propeller type, scissors type or three-vane-sweepback blades or like have been developed, the basic flow of materials during stir still consists of vortex flow with the impeller shaft as vortex center, and vortex ring with circumferential streamline between solid vortex nucleus zone and vessel wall as a plurality of toroidal vortex, i.e., axial circulation of vortex ring flow on vertical plane. Besides, although combination of different impeller stage numbers and different impeller types can be used, and even supplemented by accessories as baffles and draft tube, only the magnitude of the relative static solid vortex nucleus zone and the shape, size and number of vortex rings may be changed. Because the streamline of the above two kinds of vortex is perpendicular or almost perpendicular to the velocity gradient, temperature gradient and concentration gradient, its effect on convection heat-transfer and mass-transfer is zero, hence the heat-transfer and mass-transfer in vortex nucleus will mainly rely on molecular diffusion.

The agitation power input needed is greatly increased due to the increase of the diameter and rotation rate of impeller, but the mixing effectiveness as well as the heat and mass transfer capability can not be obviously improved due to the mass, momentum and vorticity conservation of vortex, so that the exchange of heat and mass is constrained.

As a consequence of further increasing number, diameter and rotation rate of impeller there is an even greater need for power input to operate. Although the mixing performance as well as the heat and mass transfer has been infinitely improved, the productivity will still be lower than expectation corresponding to energy consumption.

In large tanks with vertical agitator assembly, the preferable method of reducing swirling is to provide baffles that impede rotational flow without interfering with radial or longitudinal flow. A simple and effective baffling is attained by installing vertical strips or rows of tubes to the wall of the tank at some angles. However, baffles always consume more power than the case without baffles, particularly for the operation at high Reynolds number. When high shear in the impeller itself is desired, draft tube is used to control the direction and velocity of current coming into the impeller. The power input of agitation will increase, owing to the velocity in the draft tube increasing.

For instance, in the diffusion controlled notification reaction of furacillin and reduction reaction of nitrobenzene, when the reaction heat at the toroidal vortex is unable to be effectively removed by stirring with conventional equipment and out of control, reactants will explode, whereas the nonuniformity in temperature will result in increasing by-products. In the polymerization reaction of polyvinyl chloride, the reaction heat is also difficult to be removed from the toroidal vortex even in suspended and emulsified solution, and the nonuniformity in temperature will lead to low productivity and difficulty in quality control. In biological reaction tanks such as those for fermentation, due to a difficult replenishment of oxygen required for aerobic fermentation in the toroidal vortex and a difficult removal of heat, the metabolism of bacteria is usually affected and thus the productivity and the product quantity is seriously decreased.

To sum up, the conventional agitation apparatuses can only rely on increasing the number of stirring impeller stages, decreasing vortex ring diameter and/or enlarging blade diameter and raising stirring rate, to achieve high shearing flow zone around blades and near the wall and to increase (or decrease) concentration and to raise (or to drop) temperature in the outmost streamline of vortex rings by turbulent diffusion. In this way, it is possible to raise the total amount of heat-transfer or mass-transfer, but impossible to raise tangibly and effectively the overall coefficient of heat-transfer or mass-transfer. Obviously, the conventional agitation apparatuses are poor in homogeneity of mixing, low in gloss coefficients of heat-transfer and mass-transfer, high in energy consumption, low in productivity and unstable in quality of products. In the China Patent No. CN1033528A (Application No. 87101299.5) by Zai-Li Xie (assigned to Zhejiang Petroleum-Chemical Designing Institute), a kind of fermentation tank is disclosed, which uses gas jet and venturi tube to mix gas and liquid and utilize mechanical energy of gas flow tangential velocity to lower the stirring power. However, the said patent is 1) necessary to work under the designed working condition, otherwise would obviously lower the mixing effect, and thus poor in operation flexibility; 2) unable to improve axial circulation of materials in the tank; 3) complex in structure and difficult in cleaning; 4) unable to improve homogeneity effectively.

In order to overcome above said defects, a plurality of static mixer means are independently and separately disposed in a traditional agitation apparatus. Said static mixer means is generally used in pipeline production having very short process time in prior art. The agitation apparatus is generally used in batch production having longer process time. Therefore, the mechanical energy of impeller or fluid media introduced into agitation apparatus make said static mixer means to work, the performance of agitation apparatus according to the invention is excellently improved.

Thus an agitation apparatus which can be used in aqueous fermentation process, polymerization process, monophase and multiphase chemical reaction controlled by diffusing process, mixing, dissolving, dispersing and extracting process in liquid media having higher productivity under far lower agitation power input, with considerably improved operation performance and increased operative flexibility, is highly desirable. Particularly, retrofit of existing agitation process vessel can be easily completed with far shorter pay-back period.

OBJECTS OF THE INVENTION

It is an object of this invention, therefore, to provide a novel agitation process apparatus which can be efficiently and effectively used in aqueous fermentation process, suspended solution and emulsified solution polymerization process, monophase and multiphase chemical reaction process and generally mixing, extracting, dispersing and dissolving process based on greater heat and mass transfer capability.

Another object of the present invention is to provide a novel agitation process apparatus suitable for use in abovementioned process considerably saving power input, increasing productivity and having more flexible operation performance.

Another object of the invention is to provide a novel agitation process apparatus of the above type which can be obtained by the retrofit of existing apparatuses with fairly shorter pay-back period.

Other aspects, objects and advantages will be apparent from the specification, the drawing and the appended claims.

CONTENTS OF THE INVENTION

In view of the above-mentioned deficiencies, the object of the present invention is to provide a kind of agitation apparatus which is able to introduce axial cycling flow effectively and improve stirring homogeneity significantly.

The agitation apparatus of the present invention consists of a vessel, an electric motor, an agitator assembly with blades, process pipelines and one or more static mixer(s). The vessel has a substantially circular cross-section. The agitator assembly is associated with the agitation vessel and includes a drive shaft and agitator means attached to the shaft located within the vessel and having a substantially vertically oriented axis of rotation. The static mixer means is an open duct having an inlet, an outlet and segmented stationary elements for successively dividing and recombining portions of fluid stream through static mixer means. The static mixer means are disposed independently and separately in the vessel. Where no continuous gas media are introduces into the vessel, the agitation apparatus of the invention utilizes a plurality of static mixer assemblies independently and separately disposed closely to the impeller in the vessel provided with common components and assemblies that are same as the general agitation apparatus. Each static mixer assembly comprises a static mixer means, a collector means and a flow guide elbow means smoothly connected and communicated with said static mixer means and collector means. The collector means axis is oriented to flow current leaving the blade tips of the impeller. The liquid media flow into the collector means by the mechanical energy of said flow current via the flow guide elbow means. The flow current causes the static mixer means to work to augment gas-liquid microcosmic mixing and microcosmic heat, mass transfer. The outflow current of gas-fluid mixed media at the outlet of static mixer means induce a longitudinal Taylor column vortex through all the height of the fluid media contained in the vessel at the position of the outlet of the static mixer. The longitudinal Taylor column vortex enhances gas-fluid media macroscopic mixing. Accordingly, the Taylor column through all the toroidal vortex flow pattern effectively accomplishes longitudinal convective heat and mass transfer with the much lower agitation powers input than that needed for the conventional agitation apparatus.

The agitation apparatus of the present invention is provided further in the vessel with one or more nozzles which is arranged in one story or several stories with one or more nozzles in each story. The outlet of each nozzle is directed against the collector of the static mixer or. Moreover, the exit of each nozzle may also be inserted into the flow guide elbow means of the static mixer or swirler. Each nozzle means is attached to a gas distributor box means which is associated with a gas inlet means. The nozzle means directs jet flow to the static mixer means. The jet draws liquid media that are closed to the inlet of the static mixer means, augments gas-liquid microcosmic mixing and microcosmic heat, mass transfer.

The spatial relationship and connecting manner between the static mixer means and nozzle means are also specified to ensure the suction effect and the production of the Taylor column vortex.

In the agitation apparatus of the present invention, the impeller blades of various stages can be in different forms, one or more stories of static mixers can be fixed around the blades of the mechanical blade type impeller. Each story has 1 to 10 static mixers which can be in different types. Each static mixer can be in different element number.

In the agitation apparatus of the present invention, the outflow direction of the static mixer in front of the exit of the nozzle fixed at the bottom of the vessel makes an angle of $\alpha$ (4°~160°) with the horizontal plane; at the other positions of the vessel, for example, in the middle or at the upper, the outflow direction of the static mixer in front of the exit of the nozzle makes an angle of $\alpha$ (−160°~−4°) or $\alpha$ (40°~160°); with a preferred outflow direction at the $\alpha$ of −110°~−60° or 30°~90° (negative sign means downward outflow). The projection of the outflow direction of the static mixer on the transverse cross-section makes an angle of $\beta$ with the circumferential tangent at the outlet of the static mixer and an angle of $\gamma$ with the radius of the said circumference. Both $\beta$ and $\gamma$ can be 0°~90°.

In the agitation apparatus of the present invention, the exit of nozzles can be circular or elliptical with the major-minor axis ratio being 1:1 to 1:5. The mounting angle of the exit of nozzle with horizontal plane is $\theta$ (5°~90°) which can be adjusted to the direction of mounting angle $\Phi$ of the static mixer or to the direction of mounting angle of the collector at the inlet of the static mixer, or else to guide flow by aligning the said collector to the mounting angle of nozzle.

The agitation apparatus of the present invention, at the time of without the input of continuous gas phase reaction media, is provided with a liquid material pumping system or an inert gas system for cyclical use under or above liquid surface or outside the vessel. The agitation apparatus of the invention is further equipped with a cyclic pumping assembly or a cyclic inert gas compressor assembly suitable for use in case of no continuous gas media being introduced into agitation vessel. The cyclic pumping assembly comprises a suction pipeline means, a discharge pipeline means, a media distributor box means and a pump. A little portion of the media in the vessel are drawn through suction pipeline means with the mechanical energy being increased, and are discharged at the outlet of the nozzle means via discharge pipeline means and the media distributor box means. A media jet causes the static mixer means to work in the same way. The compressor provides mechanical energy to form an inert gas jet which causes the static mixer means to work. By the two ways the power input needed for the cyclic media is always lower than the saved agitation power input, due to a little portion of the cyclic media in the vessel being used for the above purpose.

In the agitation apparatus of the present invention, the diameter of impeller blades in a same agitation apparatus can be different.

In the agitation apparatus of the present invention, the inlet end of the swirler is connected to the outlet end of the nozzle in an end-to-end mode.

In the agitation apparatus of the present invention, an interconnected suction tube is further provided between the nozzle and the static mixer. The suction duct means is in with one or more holes opened on its wall.

As another alternative, all or part of the static mixer means used in the invention can be respectively replaced by a swirler means which is an open pipe with inner helical-ribbon which needs lower pressure drop than that of the static mixer means. The combination of the swirler assembly with the flow guide elbow means, collector means and the agitator assembly is more suitable in case of low agitation rotation rate, high viscosity of liquid media and no continuous media introduced into agitation vessel.

In the agitation apparatus of the present invention, the nozzles are mounted on a gas distributing box connected to a gas (liquid) inlet means. The gas distributing box is a hollow spheroidal or ellipsoidal vessel with a major-minor axis ratio of 1:1~1:20. The gas inlet means can be inserted in from the minor axis (up and down) direction or the major axis (lateral) direction. Nozzles are distributed on the spheroidal surface where one or more slag eyes opened up and down.

In the agitation apparatus of the present invention, due to the adoption of the static mixer or swirler, by the action of mechanical impeller or by the guiding flow action of outlet gas (liquid) jet of nozzle through collector, liquid material is agitated intensively in the mixer or swirler and the axial flow that is introduced by Taylor vortex column owing to the outflow of the static mixer or swirler can be intensified. The axial flow also drives a cycle flow in the vessel, therefore produces effective convection mass-transfer and heat-transfer and raises the coefficients of dissolving oxygen, mass-transfer and heat-transfer and the reaction rate controlled by diffusion. Thus the stage number and diameter of blade and the revolution rate of impeller can be reduced, as a result of the combination of components employed in the novel agitation process vessel without traditional baffles and draft tubes, the agitation apparatus provides both enhanced microcosmic and macroscopic mixing and heat and mass transfer capability. The agitation apparatus is quite efficient in every performance and needs much less agitation power input for liquid media agitation process, so that the effect of energy-saving and production-increasing will be significant.

BRIEF DESCRIPTION OF APPENDED DRAWINGS

FIG. 2a is a schematic diagram of the agitation apparatus with three propeller assemblies in which one story of nozzles and static mixers or swirlers coordinates with three stages of mechanical impellers;

FIG. 2b is a schematic diagram of the agitation apparatus of the present invention in a cutaway view elevation, in which upper two axial propellers, lower radial turbine impeller, one story of nozzle means and static mixer means are equipped;

FIG. 2c is a schematic diagram of the agitation apparatus of the present invention in a cutaway view elevation, in which three radial turbine impellers, one story of nozzle means and static mixer means are equipped;

FIG. 3a is a schematic diagram of the agitation apparatus with two axial propeller assemblies in which one story of nozzles and static mixers or swirlers arranged in two circles coordinates with two stages of mechanical impellers;

FIG. 3b is a schematic diagram of the agitation apparatus of the present invention in a cutaway view elevation, in which two radial turbine impellers, one store of nozzle means and static mixer means with inlet collector means are equipped;

FIG. 3c is a schematic diagram of the agitation apparatus of the present invention in a cutaway view elevation, in which upper axial propeller, lower radial turbine impeller and one story of nozzle means and static mixer means in two circles are equipped;

FIG. 4 is a schematic diagram of the agitation apparatus in which two stories of nozzles and static mixers or swirlers coordinate with two stages of mechanical impellers;

FIG. 5 is a schematic diagram of the agitation apparatus in which one story of nozzles and static mixers or swirlers in two circles coordinates with one stage of mechanical impeller;

FIG. 6a is a schematic diagram of the mounting angle of a static mixer or swirler in projection of mixer or swirler on horizontal cross-section;

FIG. 6b is a schematic diagram of the mounting angle α of the static mixer means in accordance with the present invention;

FIG. 7a is a schematic diagram of a Kenics' static mixer;

FIG. 7b is a schematic enlarged elevation cutaway view of the swirler means used in the present invention;

Figure 8A:
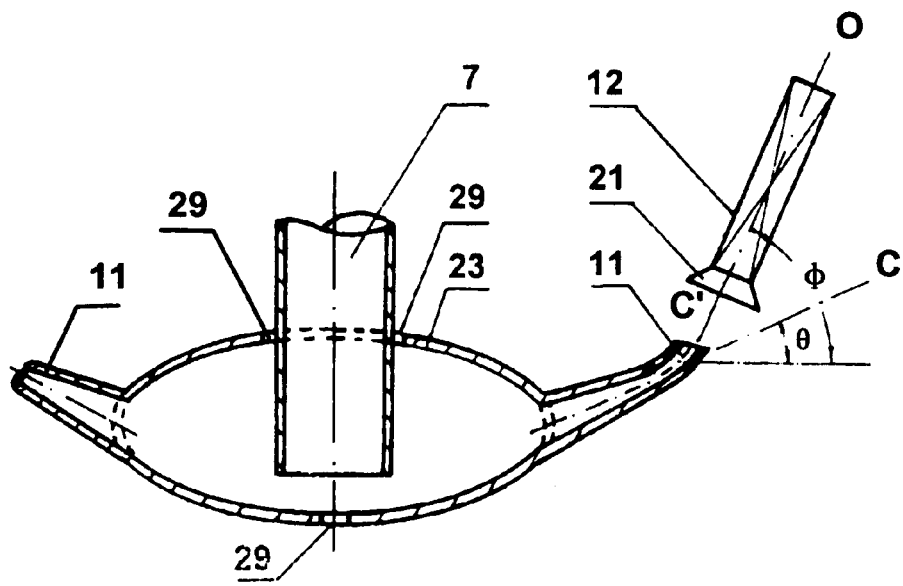
Figures 8B, 8C:
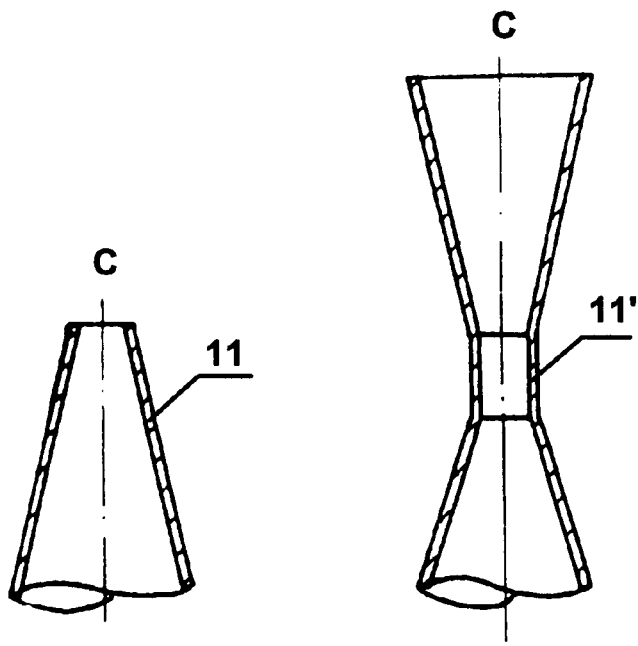
Figure 11A:
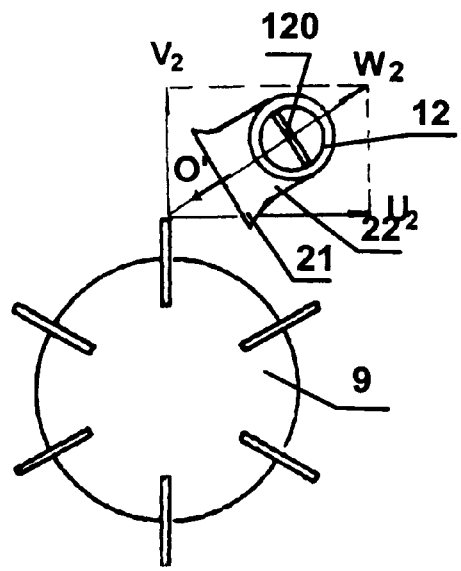
Figure 11B:
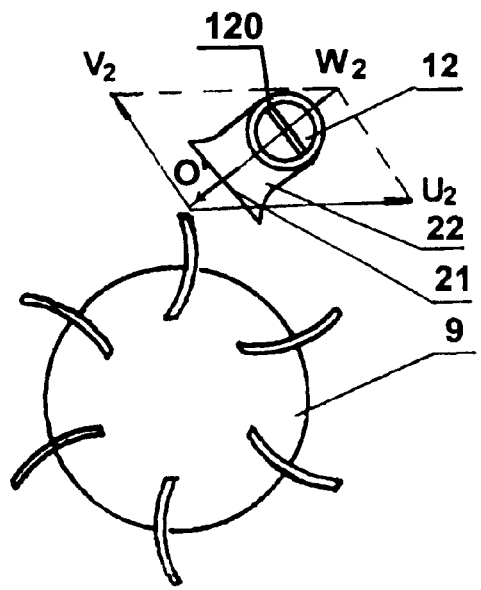
Figure 11C:
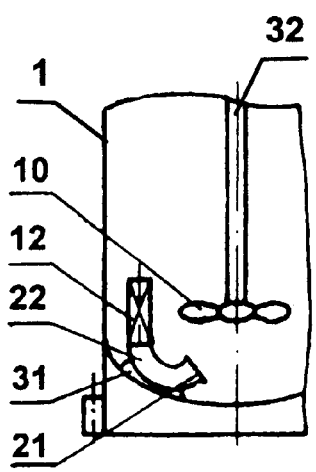
Figure 11D:
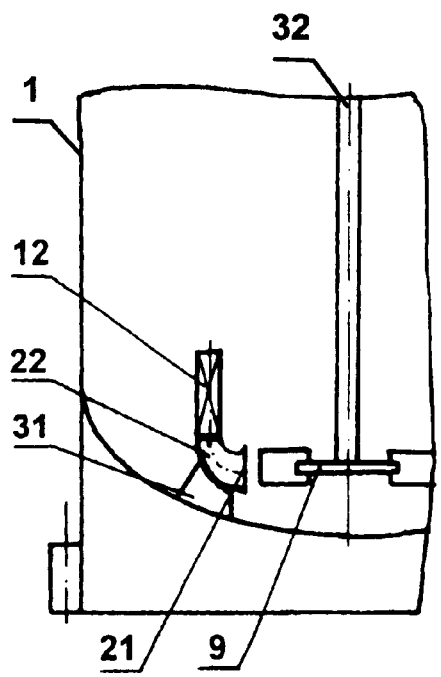
Figures 12A, 12B:
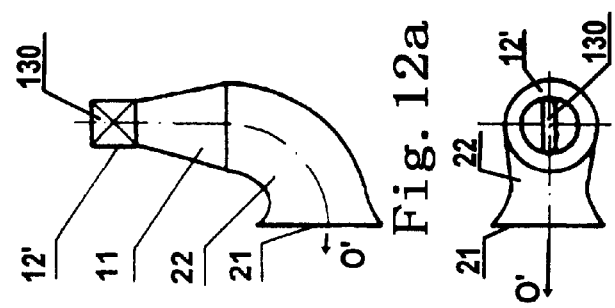
Figure 13:
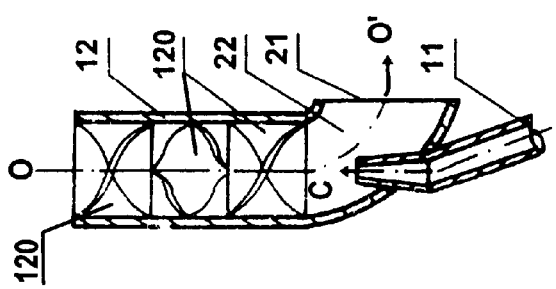
Figure 14:
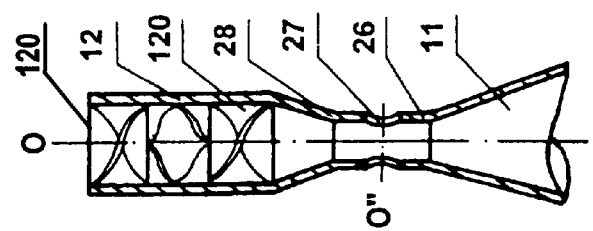
Figure 15A:
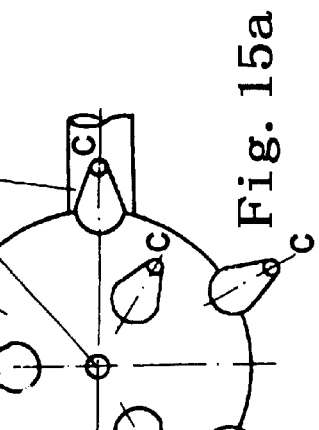
Figure 15B:
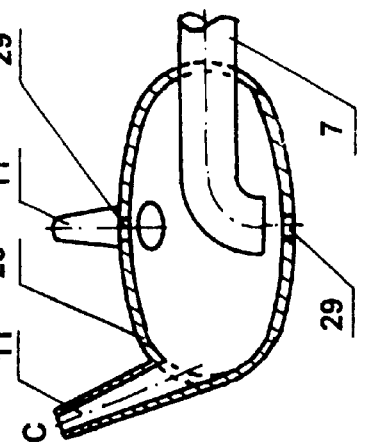

FIGS. 7c(i) and 7c(ii) are respectively an elevation cutaway view and a sectional view of a kind of stacked static mixer means with two parallel elements used in the present invention;

FIG. 7d is an elevation cutaway view of the static mixer means with a inlet collector means in accordance with the present invention;

FIG. 7e is an elevation cutaway view of a static mixer assemblies with a inlet collector and flow guide elbow means in accordance with the present invention;

FIG. 8a is a Schematic mounting diagram of nozzle and static mixer or swirler;

FIG. 8b is a cutaway view of a converging nozzle means used in the present invention;

FIG. 8c is a cutaway view of a converging-diverging nozzle means used in the present invention;

FIG. 9a is a schematic diagram of an auxiliary material liquid pumping system mounted to the inside of the dome of an agitation apparatus for nozzles working at the time of without continuous input of gas phase reaction media or during anaerobic fermentation;

FIG. 9b is a schematic diagram of one alternative agitation apparatus with an additional cyclic liquid media pumping assembly mounted to the inside of the bottom of the vessel in a cutaway view in accordance with the present invention;

FIG. 9c is a schematic diagram of one alternative agitation apparatus with an additional cyclic liquid media pumping assembly mounted to the outside of the vessel in a cutaway view in accordance with the present invention;

FIG. 10 is a schematic diagram showing the coordinating use of downward nozzles and static mixers or swirlers with mechanical impellers;

FIG. 11a is a schematic diagram showing that a static mixer or swirler with collector and flow guide elbow means is arranged along the absolute fluid velocity direction of blade outlet, in case of a straight vane radial impeller;

FIG. 11b is an overhead view of a radial impeller with curved blades and a static mixer means or swirler means showing the mounting direction of the inlet collector means in accordance with the present invention;

FIG. 11c is a partially cutaway view of an axial propeller and a static mixer assembly or swirler assembly showing the mounting direction of the inlet collector means in accordance with the present invention;

FIG. 11d is a partially cutaway view of a radial turbine impeller and a static mixer assembly or swirler assembly showing the mounting direction of the inlet collector means in accordance with the present invention;

FIG. 12a is a schematic sectional view showing that a nozzle and a swirler are connected in end-to-end mode;

FIG. 12b is an overhead view of the connection way in end-to-end mode between a swirler means and a nozzle means with attached an inlet collector and a flow guide elbow tube in accordance with the present invention;

FIG. 13 is a sectional view showing that the exit of a nozzle is inserted in the flow guide elbow means of a static mixer or swirler;

FIG. 14 is a sectional view showing that an suction duct with opened hole is connected between a nozzle and a static mixer or swirler;

FIG. 15a is a schematic overhead view showing that nozzles arranged in the one-story-two-circle mode are mounted on a gas distributing box of the present invention;

FIG. 15b is a cutaway view of the media distributor box means connected with the media inlet means equipped with a plurality of nozzle means in the present invention;

DETAILED DESCRIPTION OF THE PRESENT INVENTION

Referring to the drawings, the agitation apparatus of the present invention will now be described in great detail.

Some common components employed in the present invention are the same as in general agitation apparatuses.

The agitation process apparatus as shown in FIGS. 1, 2a, 2b, 2c, 3a, 3b, 3c, 4, 5, 9a, 9b, 9c, 10, 11c, 11d has a vessel 1 which is a hollow interior chamber adapted to contain fluid media therein, wherein the long cylindrical vessel 1 generally has circular horizontal cross-sectional shape.

The common major components of the agitation apparatus mounted to the dome of said vessel 1 include a gas discharge outlet means 2, an upper inlet means 3 for supplying the reaction media or bacteria nutrient liquid media, a man-hole means 4 for maintenance and cleaning. The common major components mounted on the bottom of said vessel 1 include a lower liquid media inlet means 6, a lower liquid media outlet means 8 and a gas inlet means 7 inserted into said vessel through the bottom shown in FIGS. 1, 2a, 2b, 2c, 3a, 3b, 3c, 4, 5, 9a, 9b, 9c, 10, 11c, 11d. The gas inlet means 7 can enter from the side-shell of said vessel 1 as shown in FIGS. 4, 10.

The common heat exchanger assembly 5 comprises a plurality of array of parallel tubes means, a plurality of U-shape bend, an inlet means and outlet means of heat exchanging media which are not respectively designated with numeral. Said heat exchanging assembly 5 can be replaced by a heat exchanging jacket mounted on the wall outside said agitation vessel 1 of the present invention, which is not shown in figures. Those of skill in the art recognize that a widely varied structure, geometry, number of said component, all size and practicable position therein can be designed and determined for specific process operation.

The agitation vessel 1 as illustrated in FIGS. 1, 2a, 2b, 2c, 3a, 3b, 3c, 4, 5, 9a, 9b, 9c, 10 11c, 11d is commonly equipped with a shaft 32 which is driven by a drive means that is not shown in FIGS. 1, 2a, 2b, 2c, 3a, 3b, 3c, 4, 5, 9a, 9b, 9c, 10, 11c, 11d. Said shaft 32 is fitted with at least one impeller, in FIGS. 1, 2a, 2b, 2c, 3a, 3b, 3c, 4, 5, 9a, 9b, 9c, 10, 11c, 11d generally designated by the numeral 9, representing a turbine impeller, or 10, representing a propeller. Impellers 9 and 10 each contains a plurality of blades, those of skill in the art recognize that the actual number of blade of impeller will function suitably in the practice of present invention. In addition, the rotation rate, the blade type, blade mounting way of the impeller can be designed in a different type and way for a practical process as are known in the art. The impeller designs other than the general designs illustrated herein can be employed, such as paddles, marine type propeller, scissors type turbine impeller and the like.

Except a zone swept by said impeller 9 and 10 rotation, there is an unobstructed zone which is both zones between the tip of impeller blade and inner diameter of vessel 1 and longitudinal space between the impellers.

The diameter of agitator assembly 9, 10 in the same agitation apparatus can be different, so that the velocity differential between the toroidal vortexes generated by said impellers having different diameters enhances the local shear mixing. At the same time, said static mixer means and nozzle means further employed allow the diameters of said impellers to be decreased. Then said decreased diameters permit the input power required to further fall. Static mixers or swirlers are mounted on support structure means 31 as shown in FIG. 1.

Figure 1:
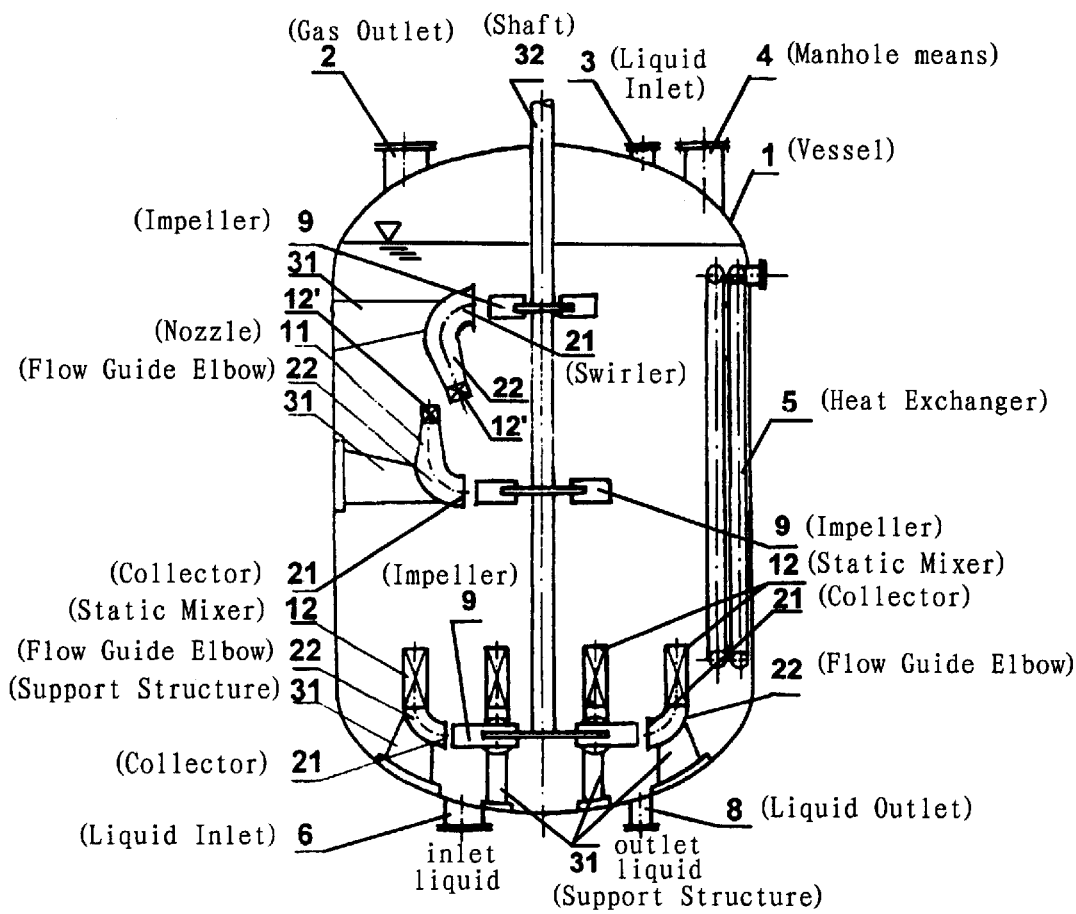
FIG. 1 is a schematic diagram showing the relative position of static mixers or swirlers mounted in the agitation apparatus with agitator assembly.

One embodiment of the agitation apparatus of the present invention is shown in FIG. 1 under the condition of no continuous gas media introduced into said agitation vessel 1. Besides above said common and universal components, at least one static mixer assembly 42 is separately and independently disposed in the unobstructed zone of said vessel 1. Said static mixer assembly 42 makes use of portions of the mechanical energy of current leaving the blade tips of impeller. By means of static mixer means, the microcosmic and macroscopic mixing as well as heat and mass transfer capability are increased.

Static mixer assembly 42 is also shown in the FIGS. 7e, 11a, 11b, 11c, 11d. Said static mixer assembly 42 comprises a static mixer means 12, a collector means 21 and a flow guide elbow means 22 as shown in FIGS. 1, 7e, 11a, 11b, 11c, 11d, 13. The structure of every static mixer means 12 of said static mixer assembly 42 is shown in FIGS. 7a, 7c, 7d, 7e. The mounting angles α, β and γ are shown in FIGS. 6a, 6b. Alternatively, the static mixer means 12 comprises an open pipe with two inner open pipes 121 having a plurality of segmented stationary mixing elements 120, as shown in FIG. 7c. Those of skill in the art recognize that the static mixer type, diameter, number of the mixing elements will be a function of the rotation rate of impeller, blade type of the impeller, media viscosity. The Kenics static mixer means 120 with 2–10 elements as shown in FIG. 7a will be preferable. The inlet collector means 21 having cone shape or an arc shape surface to benefit liquid media entering the static mixer means 12 is shown in FIGS. 1, 7d, 7e, 8a, 11a, 11b, 11c, 11d, 12a, 12b, 13. Said flow guide elbow means 22 for turning media flow direction from inlet to outlet can connect and communicate static mixer means 12 with inlet collector means 21 as shown in FIG. 7e and FIGS. 1, 11a, 11b, 11c, 11, 12a, 12b, 13. The inlet and outlet axis of said flow guide elbow means 22 should respectively be in alignment with the axis (reference alphabet O') of inlet collector means 21 and the axis (reference alphabet O) of said static mixer means 12. The cross-section area along the flow direction is generally reduced to increase outlet velocity of said static mixer means 12.

Each said static mixer assembly 42 is mounted to support structure means 31 attached to said vessel 1 at said defined static mixer means mounting angles $\alpha$, $\beta$ and $\gamma$. An axis O' of said collector means 21 is oriented to actual current leaving the blade tips of the impeller means 9 as shown in FIG. 1, then a portion of media current is provided to static mixer means 12 via collector means 21 and a flow guide elbow means 22 which smoothly turns media from said collector 21 into static mixer means 12. Said fluid media is successively divided, twisted, delivered from one stationary element 120 to the succeeding element 120. Through $2^n$ divisions and recombination, said fluid media passing through the static mixer means 12 are efficiently mixed and blended, enhancing the microcosmic mixing, gas-liquid dispersing, chemical reaction, and heat and mass transfer. The fluid media flowing off said static mixer means 12 is a swirling column, which can induce a longitudinal Taylor column in rotation fluid field of agitation vessel 1. As a result of the heat, mass, momentum and energy conservation of the toroidal vortex flow zone (reference numeral 58 as shown in FIG. 2c), said longitudinal Taylor column vortex expends through all toroidal vortex flow zone enhancing the macroscopic longitudinal mixing, heat and mass transfer and chemical reaction.

As one alternative, at least one upper and middle swirler assembly is separately and independently employed in said embodiment of the present invention as shown in FIG. 1. Said swirler assembly comprises a swirler means 12', a flow guide elbow means 22 and a collector means 21. The axis O' of said collector 21 is oriented to actual current leaving blade tips of impeller 9. The swirler means 12' is used for inducing longitudinal Taylor column vortex, whereby the mechanical energy of said current leaving the blade tips of impeller pushes the liquid media into swirler means 12' via collector means 21 and flow guide elbow means 22. While the rotation rate of the impeller is slower so that the mechanical energy is not enough in said current leaving blade tips of impeller, the swirler means 12' is more preferable than static mixer means 12. Referring to FIGS. 11a, 11b, 11c and 11d, it is clear that when there is no nozzle, the mounting direction of the collector 21 for static mixer 12 ought to be along the absolute velocity direction of the blade outlet: (a) Turbine impeller assembly 9 with straight vane; (b) Turbine impeller assembly 9 with curved vane; (c) Schematic mounting diagram for propeller assembly 10 in the vessel 1; (d) Schematic mounting diagram for turbine impeller assembly in the vessel 1. The flow guide elbow means 22 is used for smooth conveyance of fluid onto the mounting direction of the static mixer. The nomenclature is the same as in FIGS. 11a and 11b. $U_2$ is the velocity of the blade tips, $V_2$ is the velocity of the liquid leaving the blade tips and $W_2$ is actual current velocity of media leaving the blade tips in FIGS. 11a and 11b. In FIG. 11a, a static mixer assembly 42 with flow guide elbow 22 and collector means 21 is positioned in close proximity to a flat-blade turbine impeller with six blades clockwise rotating. By the term "close proximity" it is meant that the blade tips and the collector inlet are spaced at intervals to permit swing of the shaft 32. The collector inlet axis O' is oriented towards the actual current velocity $W_2$ to benefit liquid media passing through the static mixer means 12 or swirler means 12' and flow guide elbow means 22. In FIG. 11b, a clockwise rotating back-curved bladed turbine impeller with six curved blades is closely positioned to a static mixer means 12 with flow guide elbow means 22 and collector means 21 whose axis O' orients towards the different actual current velocity direction from that in FIGS. 11a. A cutaway view of a turbine impeller 9 and static mixer assembly 42 is further illustrated in FIG. 11d. Said static mixer means 12 with collector means 21 and flow guide elbow means 22 is packed as an assembly mounted on the supporter structure 31. The mounting way of propeller and static mixer assembly 42 is illustrated in FIG. 11c. A propeller attached to shaft 32 is closely mounted to collector inlet whose axis O' is oriented to the actual current velocity leaving the blade tips of propeller 10.

As yet another embodiment of the invention, the lower static mixer assembly 42 in FIG. 1, is replaced by a plurality of swirler assembly in the vessel 1 under the condition of no continuous gas media introduced into said vessel 1. At least one story of swirler assembly is employed in said vessel of the present invention, while at least one impeller is mount ed in said vessel 1. Because the drag of said swirler assembly is smaller than that of static mixer assembly 42, said swirler assembly is more suitable for the cases of high viscosity liquid media and lower rotation rate of impeller.

Yet another embodiment of the present invention is shown in FIGS. 2a, 2b, 2c, 3a, 3b, 3c, 4, 5, 10 which illustrates a plurality of the static mixer means 12 and a lower gas inlet assembly such that a continuous gas media introduced into said agitation apparatus can be used to provide fluid media mechanical energy needed for flowing through said static mixer means 12 in the present invention. Every static mixer means 12 is mounted on the supporter structure 31. The lower gas inlet assembly comprises a gas inlet pipe means 7, a gas distributor box means 23 which is a hollow ellipsoidal vessel 23 with major-minor axis ratio ranged from 1:1 up to 1:20 and a plurality of nozzle means 11 usually having a convergent cross-section along the flow direction therein mounted on said gas distributor box means 23. Said gas inlet pipe means 7 can be inserted into said gas distributor box 23 along any direction, and preferably is inserted into said gas distributor box 23 from upper surface as shown in FIG. 8a. The outlet direction of said gas inlet pipe means 7 can maintain inserting direction or turning to either downward or upward as shown in FIGS. 8a, 15a. As shown in FIGS. 8a, 15a, 15b, a plurality of slag eyes 29 is opened in the surface of said gas distributor box means 23 for removing residuum therein. There is a suitable interval between said gas inlet pipe means 7 and the surface of said gas distributor box means 23. By the term "a suitable interval", it is meant that the annulus area of said interval below the outlet of said gas inlet pipe means 7 is substantially equal to the area of outlet of said gas inlet pipe means 7. As shown in FIG. 3b, a collector means 21 is further attached to the inlet of static mixer means 12. As the gas jet flowing off the exit of nozzle means 11 generates a local lower pressure by the inlet of static mixer means 12, the liquid media is drawn and pushed into the static mixer means 12. A small portion of media current is provided to static mixer means 12, which are successively divided, twisted, delivered from one stationary element 120 to the succeeding element 120. By the term "a small portion" it is meant that the flow capability of current coming into static mixer means 12 is far smaller than the flow capability of liquid media caused by agitating of impeller. Through $2^n$ divisions and recombination (n is the numbers of the elements 120), said fluid media flowing over the static mixer means 12 is efficiently mixed and blended, enhancing the microcosmic mixing, gas-liquid dispersing, chemical reaction as well as the heat and mass transfer. The fluid media flowing off from said static mixer means 12 is a swirling column, which can induce a longitudinal Taylor column (reference numeral 59 as shown in FIG. 2c) in the rotation fluid field of the agitation vessel 1. By the term "longitudinal Taylor column" it is meant that the fluid as extending to surface of liquid media and bottom of the vessel 1 in both directions parallel to the axis of rotation as shown in FIG. 2c. The longitudinal Taylor column can be induced by swirling outflow from said static mixer means 12 in present invention. Then the outflow pushes a column of fluid moving with its own speed ahead of local relation motion and pulls a similar column behind local relative motion. Since the outflow from the static mixer means 12 is a three-dimensional swirling motion, said longitudinal Taylor column is a local vortex related to rotation motion in the vessel 1. On account of the heat, mass, momentum, energy conservation of the toroidal vortex flow zone (reference numeral 58 as shown in FIG. 2c), said longitudinal Taylor column vortex extends through the entire toroidal vortex flow zone enhancing the macroscopic longitudinal mixing, heat and mass transfer, chemical reaction and improves the uniformity throughout said agitation vessel 1. Due to the use of gas jet mechanical energy, the rotation rate and diameter of the impeller means can be decreased, thus same agitation results and more high productivity can be obtained under much less agitation power consumption.

As another alternative, a plurality of swirler means 12' are partly or entirely in place of static mixer means 12 in above said embodiment of the present invention. Each said swirler means 12' comprises an open pipe means and an inner helical-ribbon means 130, as shown in FIG. 7b. While the gas flow capability is small, the swirler means 12' is preferable rather than the static mixer means 12 due to the drag reduction in the swirler means 12'.

As another alternative, a swirler means 12' with inner helical ribbon means 130, a flow guide elbow means 22 and a collector means 21 is packed as a swirler assembly (not shown) which is further equipped in said embodiment of the present invention suitable for smaller flow capability of gas media introducing into said vessel 1. A nozzle means 11 is disposed between swirler means 12' and flow guide elbow means 22 in end-to-end mode to facilitate increasing the velocity of said swirler outlet, as shown in FIGS. 1, 12a and 12b. The collector inlet axis O' is oriented to the actual current leaving blade tips that is not shown in FIGS. 12a and 12b. Therefore, the mechanical energy of said impeller 9 (see FIG. 1) enhances said macroscopic longitudinal convection flow for increasing the heat and mass transfer.

As one alternative, a plurality of the swirler assembly are further employed in said agitation vessel 1 equipped with a plurality of swirler means 12' and a plurality of nozzle means 11 of the invention. Said swirler assembly comprises a swirler means 12' (in place of the static mixer means 12 as shown in FIG. 7e), a collector means 21 and a flow guide elbow means 22, as shown in FIG. 7e. The collector axis O' orients substantially to the flow current leaving the blade tips of the impeller to facilitate liquid media to come into the swirler means 12'.

Referring to FIGS. 2a, 2b and 2c, it is clear how one story of nozzles 11 and the static mixers 12 or swirlers 12' above the nozzles coordinate with three stages of mechanical impellers. As shown in FIGS. 2a, 2b, 2c, the impeller types employed in said vessel 1 are different, i.e., three stories of propeller means 10 in FIG. 2a, three stories of turbine impeller means 9 in FIG. 2c, and upper two stories of propeller means 10 and lower one story of turbine impeller 9 in FIG. 2b are attached to the same shaft means 32, respectively.

Referring to FIGS. 3a, 3b and 3c, it is clear how one story of nozzles 11 and the static mixers 12 or swirlers 12' above the nozzles coordinate with two stages of mechanical impellers. As shown in FIGS. 3a and 3c, the same lower nozzle means 11 and static mixer means 12 equipped in two circles and different type of impeller means are provided, which impeller means are respectively two stories of propeller means 10 in FIG. 3a and upper propeller means 10 and lower turbine impeller 9 in FIG. 3c. As shown in FIG. 3b, a lower gas inlet assembly with one circle of nozzle means 11, one circle of static mixer means 12 and two stories of turbine impeller 9 are equipped in said agitation vessel 1.

Referring to FIG. 4, it is clear how two stories of nozzles 11 and static mixers 12 or swirlers 12' above the nozzles 11 and static mixers 12 or swirlers 12' above the nozzles coordinate with two stages of propeller assembly 10. Referring to FIG. 10, it is clear how the downward nozzles 11 and static mixers 12 or swirlers 12' under the nozzles coordinate with two stages of impeller assembly 10. Referring to FIG. 5, it is clear how one story two-circle nozzles 11 and static mixers 12 or swirlers 12' above the nozzles coordinate with one stage propeller 10. As shown in FIG. 5, two circles of nozzle means 11 and static mixer means 12 are independently and separately disposed in agitation operation vessel 1 provided with one story of turbine impeller 9. As another alternative, the middle or upper gas inlet assembly shown in FIGS. 4, 5 and 10 comprises a gas inlet means 7, a gas distributor circular tube means 24 connected to said gas inlet means 7 and a plurality of nozzle means 11 independently and separately attached to said gas distributor circular tube means 24 at said defined mounting angle θ ranging from 4° up to 90°. In FIG. 4, the one circle of nozzles 11 attached to said gas distributor circular tube means 24 orient upward to the static mixer means 12. In FIG. 10, two circles of nozzle means 11 attached to said gas distributor circular tube means 24 orient downward to the static mixer means 12. In a preferred embodiment, the agitation operation vessel in FIG. 3b will employ a lower gas inlet assembly, which includes a plurality of nozzle means 11, and a plurality of static mixer means 12, in addition to said common components and common impeller means reduced from three stories down to two stories.

Referring to FIGS. 6a and 6b, it is clear about the spatial mounting angle of static mixers or swirlers. Each said static mixer means 12 is mounted to support structure means 31 attached to said vessel 1. Each said static mixer means 12 is independently and separately mounted at mounting angles α, β, γ as shown in FIGS. 6a, 6b. The mounting angle α is an angle included between a flow axis of static mixer means 12 (reference alphabet O) and a horizontal plane, as shown in FIG. 6b. The mounting angle γ is an angle included between a horizontal projection line of the static mixer flow axis and a meridional plane containing the longitudinal axis of vessel 1 and an outlet center of static mixer 12, as shown in FIG. 6a. The mounting angle β is an angle included between a horizontal projection line of the axis of static mixer 12 and an plane perpendicular to said meridional plane at the outlet center, as shown in FIG. 6a. Each static mixer means 12 is adapted suitable mounting angle α, β and γ in accordance with actual position, space and requirement. The upward mounting angle α ranges from 4° up to 90°. The mounting angle β ranges from 0° up to 90°. The mounting angle γ ranges from 90° down to 0°. The angle β plus the angle γ is equal to 90°.

Referring to FIGS. 7a–7e, it is clear about the structures of a static mixer 12 and a swirler 12', and the structure of a static mixer assembly 42 and swirler assembly 42', wherein, the static mixers can be of different types, and the number of elements 120 contained in each static mixer or swirler can be different, too.

Every static mixer means comprises an open duct having a flow axis (reference alphabet O), a plurality of segmented stationary mixing elements 120 in said open duct as further detailed in FIGS. 7a, 7c, 7d, 7e. Alternatively, the static mixer means 12 comprises an open pipe with two inner open pipes 121 with a plurality of segmented stationary mixing elements means 120 as shown in FIG. 7c. Those of skill in the art recognize that the static mixer type, diameter, number of the mixing elements will be a function of the rotation rate of impeller, blade type of the impeller and media viscosity. The Kenics static mixer means 12 with 2–10 elements as shown in FIG. 7a will be preferable. An inlet collector means 21 with a conic shape or an arc shaped surface to benefit liquid media coming into the static mixer means 12 is shown in FIGS. 3b, 7d,7e, 8a, 11a, 11b, 11c, 11d, 12a, 12b, 13.

Referring to FIG. 8, it is clear about the relative position and mounting mode for nozzles 11 and static mixers 12 or swirlers 12' in the vessel, and the connection of gas distributing box 23 with a gas inlet means 7 and nozzle 11, as well as upper and lower slag eyes 29.

FIGS. 15a and 15b shows that the nozzles 11 can be mounted on a gas distributing box 23 of the present invention, wherein FIG. 15a is a overhead view of the gas distributing box 23; FIG. 15b is a sectional view of the gas distributing box and the arrangement of nozzles in one-story-two-circle mode.

As further detailed in FIGS. 8a and 15a, 15b, each nozzle means 11 is independently and separately positioned on the surface of the distributor box means 23 in at least one circle with a mounting angle θ which is an angle included between a flow axis of said nozzle means 11 (reference alphabet C) and a horizontal plane. The mounting angle θ of each nozzle means 11 ranges from 5° up to 90°.

As shown in FIG. 8a, it is preferred that a exit angle φ, included between an exit axis (reference alphabet C') of said nozzle means 11 and a horizontal plane, is same as the mounting angle α of said static mixer means 12, and said exit is disposed in close proximity to the inlet of static mixer means 12 to facilitate gas jet drawing fluid media into the static mixer means 12, as shown in FIG. 8a. By the term "close proximity", it is meant that the interval between the nozzle exit and the static mixer inlet is recognized by those of skill in the art as a function of velocity of the jet flowing off the nozzle 11 . As shown in FIG. 8a, the nozzle exit angle φ ranging from 4° up to 90° can be adjust to substantially orient to said mounting angle α of said static mixer means 12 as shown in FIG. 8a. The nozzle means 11 are positioned in two circles as shown in FIGS. 15a and 15b, the mounting angle θ of each nozzle means in the inner circle being greater than that in the outer circle. Each mounting angle θ of the nozzle means 11 can be selected upon the local actual mounting positions of the nozzle 11 and the static mixer means 12.

As shown in FIG. 8c, the nozzle means 11' is a converging-diverging nozzle means from which the gas flows at supersonic velocity into a diffuser cone for drawing a lower pressure to facilitate local fluid media in said vessel 1 to be drawn into static mixer means 12. The converging nozzle means 11 is the general type, as shown in FIG. 8b, for easier manufacture and operation in practical agitation process.

The exit shape is preferably ellipsoidal with major-minor axis ratio ranging from 1:1 up to 1:5. The exit area of said nozzle means 11 is determined in accordance with velocity of jet flow required.

Referring to FIGS. 9a–9c, it is clear about the condition of auxiliary liquid material pumping assembly at the time of without continuous input of gas phase reaction media or during anaerobic fermentation: (a) with an inside pump (13) on top of the vessel; (b) with an inside pump (13) at bottom; (c) with an outside pump (13).

As another alternative of above embodiment in the invention and as respectively shown in FIGS. 9a, 9b, 9c, an additional cyclic pumping assembly is further employed suitable for use in case of either no or a little continuous gas media introduction into said agitation vessel 1 or in case of the high viscosity of liquid media contained in said vessel 1. Besides the additional cyclic pumping means 13 is respectively located at the inside bottom of said vessel 1 shown in FIG. 9b, below the dome inside of said vessel 1 shown in FIG. 9a and at outside of said vessel 1 shown in FIG. 9c, the agitation apparatus substantially equips the same components with combination of static mixer means 12 and nozzle means 11 attached to a liquid media distributor box means 23 which has the same structure as said gas distributor box means 23. As shown in FIGS. 8a, 15a, 15b, a plurality of slag eyes 29 is opened in the surface of said liquid media distributor box means 23 for removing residuum therein. An additional cyclic pumping assembly comprises a pump means 13, a suction pipeline means 33 connected with the inlet of said pump means 13 for delivering liquid media in said cyclic assembly and a discharge pipeline means 34 connected with the outlet of said pump means 13 which is attached to the liquid media distributor box means 23. The performance and type of said pump means 13 is adapted as are known in the art. The working fluid in static mixer means 12 and nozzle means 11 is a small portion of liquid media contained in said vessel 1. By means of said static mixer means 12 and longitudinal Taylor column vortex, microscopic and macroscopic mixing, heat and mass transfer capability and chemical reaction are enhanced. By the pump means 13, said static mixer means 12 and nozzle means 11 can keep to operate in working way of the present invention. The pump power input is fairly less than the saved agitation power input of impeller. The uniformity of high viscosity liquid will be effectively and efficiently improved by said additional cyclic pumping assembly.

When the agitation operation is carried out in continuous mode, continuous or intermittent withdrawal of liquid media contained in agitation vessel 1 can be accomplished via outlet means 8 while the fresh liquid media such as nutrients and reactant are provided via liquid media inlet 3 and 6.

As another alternative, an additional cyclic inert gas compressor assembly suitable for use in case of no continuous gas media introduction into said agitation process vessel 1 is further equipped which is not shown in the drawings. By the term "inert gas", it is meant herein that the gas will not take part in the chemical reaction and biochemical reaction in the agitation vessel. Said cyclic inert gas compressor assembly comprises a suction pipeline means connected with gas outlet means 2 on dome of the vessel 1, a discharge pipeline means connected with gas inlet means 7 attached to said lower gas inlet assembly and a compressor increasing mechanical energy of said inert gas continuing working in said cyclic inert gas compressor assembly. The flow capability of inert gas can be determined according to velocity of jet flowing off the nozzle means 11 attached to gas distributor box means 23 to ensure static mixer means 12 normally working. As the results of combination of static mixer means 12 and nozzle means 11 using inert gas, the performance of agitation operation is still efficiently improved. Although additional power input is needed for compressor means, due to the agitation power input being greatly decreased, the total power input still falls. When the uniformity for chemical reaction is very important, said inert gas compressor assembly is needed.

When the rotation rate of impeller is slower, the diameter of impeller is shorter and liquid media viscosity is relatively high, said additional cyclic inert gas compressor assembly or additional cyclic liquid media pumping assembly is suitable for improving the uniformity and heat and mass transfer capability in overall agitation vessel 1.

FIG. 12 shows that the inlet of the swirler is connected with the outlet of the nozzle in an end-to-end mode.

As yet another alternative, said nozzle means 11 is directly connected with said static mixer means 12 or swirler means 12' by the way of end-to-end mode. By the term "end-to-end mode", it is meant that the outlet of said nozzle means is directly welded up the inlet of said static mixer means or screwed joint. This connection way is not in place in drawings, but a local portion of FIG. 12a illustrates a swirler means 12' attached to a nozzle means 11. While the longitudinal convection flow in all height of said vessel 1 for improving uniformity is of important effect on agitation process, said connection way of end-to-end mode between said nozzle means and said static mixer means is suitable for said situation. When the cyclic pumping assembly is utilized, above said connection method is yet a preferred embodiment.

As yet another alternative, said nozzle means 11 is directly connected with said swirler means 12' by the way of end-to-end mode. This connection way is not in place in the drawings, but a local portion of FIGS. 12a and 12b illustrates a swirler means 12' attached to a nozzle means 11. While the longitudinal convection flow in all height of said vessel 1 for improving uniformity is of important effects on agitation process, said connection way of end-to-end mode between said nozzle means and said swirler means is suitable for said situation. When the cyclic pumping assembly is utilized, above said connection method is yet a preferred embodiment.

FIG. 13 shows that the exit of each nozzle can be inserted into the flow guide elbow means of the static mixer 12 or swirler 12'.

FIG. 14 shows that an suction duct means 26 is provided between the nozzle 11 and the static mixer 12 or swirler 12', which is cylindrical and with one or more holes 27 opened on its wall.

As another alternative and shown in FIG. 14, a suction duct means 26 is employed to connect and communicate said each nozzle means 11 with each static mixer means 12, which is a hollow duct with at least one hole 27 opened on the wall of said suction duct means 26. The liquid media along open hole axis O" (reference alphabet O") at the wall of suction duct 26 is drawn to static mixer means 12, whereby the lower pressure in said suction duct means 26 is generated by jet flow of the nozzle along axis C.

In the present invention, traditional baffle and draft tube is universally dismantled as shown in FIGS. 1, 2a, 2b, 2c, 3a, 3b, 3c, 4, 5, 9a, 9b, 9c, 10, 11c, 11d, so as to save more agitation power input.

A variable frequency power supply or variable rotation rate gearboxes is further equipped in said agitation apparatus of the present invention to control rotation rate of the shaft 32, then significant effects can be much easily reached in saving agitation power input, increasing productivity, improving quality of the products and facilitating the process control in the present invention. Particularly, it is beneficial to the retrofit of the existing traditional agitation apparatuses.

There is a number of other practical advantage to the use of the novel agitation apparatus in the invention. As mentioned, the flexibility of the process operation is improved, controllability is more stronger, by-product is deceased, payback period for the retrofit is shorter than one year.

As shown in the following examples, Applicants have constructed apparatus in accordance with the present invention, and testing on the same that it is very effective for polymerization and fermentation process operation.

INDUSTRIAL APPLICABILITY

According to different process requirements of mixing, dissolving extracting, reaction or fermentation for different media such as air, oxygen, nitrogen, carbon dioxide, reaction gas, inert gas or liquid material in the vessel for cyclical use which can be jetted by nozzles, either nozzles and static mixers (or swirlers) or static mixers (or swirlers) connected to collector and guiding flow tube are coordinated with mechanical impeller in the agitation apparatus of the present invention, both result in increasing the coefficients of mixing, dissolving (or oxygen dissolving), mass-transfer and heat-transfer and the reaction rate controlled by diffusion. By means of reducing stage numbers of impeller and diameter of blades and adopting variable-frequency power supply or gearboxes for controlling shaft revolution rate in large range, it is possible to obtain considerable effects of saving agitation power and increasing productivity. For agitation apparatus of very large volume (with three stages of mechanical impeller, it is preferable to adopt an installation as shown in FIG. 2a and an installation as shown in FIG. 10, i.e., change the three stages to two stages of mechanical impeller with the diameter of upper stage blade reduced and with nozzles and static mixers or swirlers arranged in one-story-two-circle mode (their type, structure and size depending on media and process requirements). Under the condition of without continuous input of gas phase media (including anaerobic fermentation), it is preferable to adopt an agitation apparatus in which static mixers or swirlers with collector and guiding flow tube are used in coordination with mechanical impeller as shown in FIG. 11. By using variable-frequency power supply or gearboxes to control revolution rate of the shaft, significant effect can be reached in energy-saving and production-increasing.

EXAMPLE 1

For instance, in the application of the agitation apparatus of the present invention for suspended polymerization of polyvinyl chloride, raw materials of chloroethylene monomer, initiator, etc. are stirred in water after being put into the vessel, and polyvinyl chloride is produced through polymerization. The volume of the agitation apparatus is 50 m³, in which the baffles can be eliminated. At the lowest stage of the agitation apparatus, a disk type turbine impeller assembly 9 with six curved-back blades can be used. At the second and third stages, scissors type impeller with six blades can be used. The diameter of the second stage blade is reduced by ⅓, while the diameter of the third stage blade is reduced by ½. On the bottom support structure means 31 of the agitation apparatus, six Kenics' static mixers 12 with flow guide elbow means 22 and collector 21 are provided, each Kenics' static mixer contains three elements 120 with a diameter larger than 15 mm. The clearance between the collector 21 and the blade of agitator 9 is larger than the transversal swing distance of the shaft and the collector is directed against the absolute velocity of the blade outflow.

The chloroethylene monomers in water under high shearing rate are in suspended state. In addition to the liquid current circulation as in conventional agitation apparatus, they are collected by collector 21 aligning the blade outflow at the lowest stage impeller and through the flow guide elbow means 22, then the radical and circle flow become axial. Water and monomers are further mixed and dispersed, and the outflow at the mixer outlet becomes axial swirling flow which induces stable Taylor vortex column in the entire height of liquid material in the vessel under the centrifugal force field. The said vortex column provides effective axial convection and heat-transfer convection toward the said vortex column. The total heat-transfer coefficient can be raised 2~3 times, the agitating power is reduced at least by ⅓ and may be further reduced through slowing down the revolution rate of shaft. The chloroethylene monomer concentration is increased by 10~20%, the polymerization rate raised by 5~10%. The output is significantly raised. Meanwhile, due to a decrease of monomer retrieving amount, laborious work and time for cleaning sticking vessel, the utilization of the vessel is distinctly raised. The decrease of sticking vessel also improves the product quality. Moreover, due to a distinct increase of temperature homogeneity, it is possible to control the polymerization degree and molecular weight distribution effectively.

EXAMPLE 2

In the application of the agitation apparatus of the present invention for biological fermentation, raw materials of fermentation liquor, bacteria strain, etc. are put into the vessel. In the agitation apparatus of 50 m³ are mounted three stages of disk type turbine impeller 9 with six curved-back blades, φ900 mm, a stirring electric motor of 115 kW, and the air consumption is 30 m³/min. The volume of the said raw materials is 43 m³, the average fermentation time adopted is 233 hours. There are six nozzles mounted on the gas distributing box at the bottom of the vessel. In front of each nozzle 11 is provided a Kenics' static mixer 12 with six elements mounted on the support structure means 31 at the bottom of the vessel. There is a collector 21 at the inlet of the static mixer. The diameter of the first stage blade is reduced by ⅕, that of the second stage by ⅓ and that of the third stage by ½. The revolution rate of stirring is controlled by a variable-frequency supply power. The revolution rate is slowed down by 15% on average during fermentation period. In addition to the dissolving oxygen action in conventional fermentation vessel by means of liquid circulation currents and of the shearing raw materials, not only the air from air inlet main tube of the air distributing box is jetted toward static mixers at high velocity to introduce fermentation liquid flowing into the said mixers and is mixed fully with fermentation liquid in mixers so that the coefficient of dissolving oxygen can be raised considerably and saturation can be reached at the outlet of mixers, but also the Taylor vortex columns induced in entire liquid height of the vessel by the said outflow of mixers result in effective axial convection and convectional mass-transfer (oxygen transfer) flowing into the said columns. The total coefficient of dissolving oxygen can be raised by 2~3 times. The liquid materials flowing to the liquid surface and the air which does not overflows will still be cycled in the vessel by impeller. By adopting the agitation apparatus of the present invention, the stirring power can be lowered by 67%, the gibberellin output increased by 16.15% and air saved by 20%.

These examples have been provided merely to illustrate the practice of the invention and not be read so as to limit the extent scope of the invention or the appended claims in any way. Reasonable variations and modifications, not departing from the essence and spirit of the invention, are contemplated to be within the scope of patent protection desired and sought.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts may be made which changes are encompassed within the scope and spirit of the present invention as defined by the appended claims.

What is claimed is:

1. An agitation apparatus comprising:
   an agitation vessel having a wall defining a chamber extending along a longitudinal axis;
   a heat exchange assembly, disposed in said chamber, and including a plurality of tubes arranged in rows that extend parallel to said longitudinal axis;
   inlet means, coupled to said plurality of tubes, for introducing a heat exchange fluid into said plurality of rows of tubes;
   outlet means, coupled to said plurality of tubes, for removing said heat exchange fluid form said plurality of rows;
   an agitator assembly including:
      a drive shaft located within said chamber and having an axis of rotation coaxially aligned with said longitudinal axis;
      a drive attached to said shaft;
      at least one impeller, mounted on said shaft, spaced apart from said wall defining a gap therebetween, said at least one impeller comprising a plurality of blades, each of which includes a tip, spaced apart from said wall defining a void therebetween, with said plurality of blades defining a swipe zone over which said plurality of blades travel by rotation of said at least one impeller and an unobstructed zone defined by both said void and said gap;
   upper inlet means, mounted to said agitation vessel, for introducing an upper liquid media into said agitation vessel;
   lower inlet means, mounted to said agitation vessel, for introducing a lower liquid media into said agitation vessel;
   lower outlet means, mounted to said agitation vessel, for removing upper and lower liquid media from said agitation vessel;
   upper outlet means, mounted to said agitation vessel, for discharging an output gas media from said agitation vessel, a gas inlet means, mounted to said agitation vessel, for introducing an input gas into said agitation vessel, said gas inlet means comprising:
  a gas inlet pipeline connected to a gas main supply tube;
  a lower gas distributor box disposed proximate to one end of said agitation vessel, wherein said lower gas distributor box includes upper and lower ellipsoidal surfaces defining a hollow ellipsoidal vessel having a major-minor axis ratio ranging from 1:1 up to 1:20, said ellipsoidal vessel being attached to said gas inlet pipeline, with a plurality of slag eyes disposed in said upper and lower surfaces to remove residuum;
  a middle gas distributor circular tube disposed at a middle portion of said unobstructed zone, and an upper gas distributor circular tube disposed at an upper portion of said unobstructed zone;
  a plurality of nozzles attached to said distributor box, each of said plurality of nozzles including an exit with an ellipsoidal cross-sectional shape having a major-minor axis ratio ranging from 1:1 up to 1:5, with a first subset of said plurality of nozzles being independently and separately positioned to said lower gas distributor box in a circle and at a mounting angle $\theta$ defined between a flow axis (C) of said nozzle and a horizontal plane, ranging from 5° up to 90°, and a second subset of said plurality of nozzles being independently and separately attached to said middle and upper gas distributor circular tube at said defined mounting angle $\theta$ ranging from −110° up to −60° downward and from 4° up to 90° upward;
  a plurality of static mixers having inlets positioned proximate to said exits of said nozzles, with the exit of each of said plurality of nozzles having an angle $\Phi$ measured between an exit axis (C') of said exit and a horizontal plane, and in the range of 4° up to 90°, inclusive, each of said plurality of static mixers being independently and separately disposed in said unobstructed zone, with a first subgroup of said plurality of static mixers being mounted at an angle $\alpha$, a second subgroup of said plurality of static mixers being mounted at an angle $\gamma$, and a third subgroup of said plurality of static mixers being mounted at an angle $\beta$, with $\alpha$ being measured between an axis (0) of said static mixer and a horizontal plane, $\gamma$ being measured between a horizontal projection line of said axis of said static mixer and a meridional plane containing both said longitudinal axis of vessel and an outlet center of said static mixer, and $\beta$ being measured between said projection line and a plane perpendicular to said meridional plane at said outlet center, with a first subportion of said first subgroup being attached to said upper gas distributor circular tube, with $\alpha$ being in the range of −160° up to −4° downward, a second subportion of said first subgroup being disposed in said middle portion, with $\alpha$ being in the range of −160° up to −4° downward and 4° up to 90° upward, with a sum of $\beta$ and $\gamma$ being 90°, with said angle $\Phi$ being oriented with respect to said angle $\alpha$ to draw fluid media into said static mixers.

2. The apparatus in accordance with claim 1 wherein said plurality of static mixers range in number from 2 up to 10.

3. The apparatus in accordance with claim 1 wherein said at least one impeller includes a plurality of impellers, with the plurality of blades associated with each of said plurality of impellers having differing shapes and a pair of said plurality of impellers having differing numbers of blades.

4. The apparatus in accordance with claim 1 further including a suction duct means connected between said plurality of nozzles and said plurality of static mixers, said suction duct means having a hollow duct with at least one hole in a wall thereof.

5. The apparatus in accordance with claim 1 further including a flow guide elbow means attached to one of said plurality of static mixers having an inlet, with a collector means connected proximate to said inlet of said flow guide elbow means for changing a direction of media flow along said axis (0), with one of said plurality of nozzles being disposed within said flow guide elbow means and oriented to facilitate drawing liquid media in said vessel into one of said plurality of static mixers.

6. The apparatus in accordance with claim 1 further including an additional cyclic inert gas compressor assembly in fluid communication with said chamber, with said inert gas compressor assembly comprising a suction pipeline means, in fluid communication with said upper outlet means, a discharge pipeline means, in fluid communication with said gas inlet means, said compressor assembly having an inlet and an outlet, with said inlet of said compressor assembly being in fluid communication with said suction pipeline means and said outlet being in fluid communication with said discharge pipeline means.

7. The apparatus in accordance with claim 1, further including an additional cyclic pumping assembly in fluid communication with said chamber, wherein said cyclic pumping assembly comprises a pump means having an inlet and an outlet, a suction pipeline means inserted into said agitation vessel which is connected to said inlet of said pump means and a discharge pipeline means attached to said lower distributor box, with said lower distributor box being connected to said outlet of said pump means, wherein said pump means provides mechanical energy for cyclic working of said cyclic liquid media.

8. The apparatus in accordance with claim 1, wherein the inlet of each of said static mixers is directly attached to the exit of each said plurality of nozzles in an end-to-end mode.

9. The apparatus in accordance with claim 1 further including a plurality of swirler assemblies each of which has a swirler, a flow guide elbow and a collector, said collector including an inlet, said plurality of swirler assemblies being independently and separately mounted to a support structure attached to said vessel, with a first subgroup of said plurality of swirler assemblies being mounted at said angle $\alpha$, a second subgroup of said plurality of swirler assemblies being at said angle $\beta$, and a third subgroup of said plurality of swirler assemblies being mounted at said angle $\gamma$, with said inlet of each said collector being positioned proximate to one of said plurality of blades.

10. The apparatus in accordance with claim 1 further including a plurality of flow guide elbows and a plurality of collectors coupled to said vessel, with a subset of said plurality of static mixers being coupled to one of said plurality of flow guide elbows and one of said plurality of collectors, each of said plurality of collectors having an inlet positioned proximate to one of said plurality of blades.

11. An agitation apparatus comprising:
  an agitation vessel having a wall defining a chamber extending along a longitudinal axis;
  a heat exchange assembly, disposed in said chamber and including a plurality of tubes arranged in rows that extend parallel to said longitudinal axis;

inlet means, coupled to said plurality of tubes, for introducing a heat exchange fluid into said plurality of rows of tubes;

outlet means, coupled to said plurality of tubes, for removing heat exchange fluid from said plurality of rows;

an agitator assembly including:

a drive shaft located within said chamber and having an axis of rotation coaxially aligned with said longitudinal axis;

a drive attached to said shaft;

at least one impeller, mounted on said shaft, spaced apart from said wall defining a gap therebetween, said at least one impeller comprising a plurality of bladed, each of which includes a tip, spaced apart from said wall defining a void therebetween, with said plurality of blades defining a swipe zone over which said plurality of blades travel by rotation of said at least one impeller and an unobstructed zone defined by both said void and said gap;

upper inlet means, mounted to said agitation vessel, for introducing liquid media into said agitation vessel;

lower inlet means, mounted to said agitation vessel, for introducing liquid media into said agitation vessel;

lower outlet means, mounted to said agitation vessel, for removing liquid media from said agitation vessel;

upper outlet means, mounted to said agitation vessel, for discharging gas media from said agitation vessel, a gas inlet means, mounted to said agitation vessel, for introducing gas into said agitation vessel comprising:

a gas inlet pipeline connected to a gas main supply tube;

a lower gas distributor box disposed proximate to one end of said agitation vessel, wherein said lower gas distributor box includes upper and lower ellipsoidal surfaces defining a hollow ellipsoidal vessel having a major-minor axis ratio ranging from 1:1 up to 1:20, with said ellipsoidal vessel being attached to said gas inlet pipeline, with a plurality of slag eyes disposed in said upper and lower surfaces to remove residuum;

a middle gas distributor circular tube disposed at a middle portion of said unobstructed zone, and an upper gas distributor circular tube disposed at an upper portion of said unobstructed zone;

a plurality of nozzles attached to said distributor box, each of said plurality of nozzles including an exit with an ellipsoidal cross-sectional shape having a major-minor axis ratio ranging from 1:1 up to 1:5, with a first subset of said plurality of nozzles being independently and separately positioned to said lower gas distributor box in a circle and at a mounting angle θ defined between a flow axis (C) of each of said nozzles and a horizontal plane, ranging from 5° up to 90°, and a second subset of said plurality of nozzles being independently and separately attached to said middle and upper gas distributor circular tube at said defined mounting angle θ ranging from −110° up to −60° downward and from 4° up to 9° upward;

a plurality of swirlers having inlets positioned proximate to said exits of said nozzles, with the exit of each of said plurality of nozzles having an angle Φ measured betweens said exit axis (C') and a horizontal plane, and in the range of 4° up to 90°, inclusive, each of said plurality of swirlers being independently and separately disposed in said unobstructed zone, with a first subgroup of said plurality of swirlers are mounted at an angle α, a second subgroup of said plurality of swirlers are mounted at an angle γ, and a third subgroup of said plurality of swirlers are mounted at an angle β, with α being measured between a swirler axis associated with one of said plurality of swirlers and a horizontal plane, γ being measured between a horizontal projection line of said swirler axis and a meridional plane containing both said longitudinal axis and an outlet center of said swirler, and β being measured between said projection line and a plane perpendicular to said meridional plane at said outlet center, with a first subportion of said first subgroup being attached to said upper gas distributor circular tube with a being in the range of −160° up to −4° downward, a second subportion of said first subgroup being disposed in said middle portion with a being in the range of −160° up to −4° downward and 4° up to 90° upward, with a sum of β and γ being 90°, with said angle Φ being oriented with respect to said angle α to draw fluid media into said swirlers.

12. The apparatus in accordance with claim 11, further including a plurality of suction ducts, each of which includes a wall having a hole disposed therein with said wall extending between one of said plurality of nozzles and one of said plurality of swirlers.

13. The apparatus in accordance with claim 11, wherein said agitator includes a plurality of drive shafts, each of which has a diameter associated therewith and said at least one impeller includes a plurality of impellers, with the plurality of blades associated with each of said plurality of impellers having differing shapes and a pair of said plurality of impellers having differing numbers of blades and mounted to shafts having differing diameters.

14. The apparatus in accordance with claim 11 further including a flow guide elbow means having an inlet, with a collector means connected proximate to said inlet for changing a direction of media flow, with one of said plurality of nozzles being disposed within said flow guide elbow means to facilitate drawing liquid media in said vessel into on of said plurality of swirlers.

15. The apparatus in accordance with claim 11, wherein the inlet of each of said plurality of swirlers is directly attached to the exit of each of said plurality of nozzles in an end-to-end mode.

16. The apparatus in accordance with claim 11, further including an additional cyclic inert gas compressor assembly in fluid communication with said chamber, with said inert gas compressor assembly comprising a suction pipeline means, in fluid communication with said upper outlet means, a discharge pipeline means, with said gas inlet means, said compressor assembly having an inlet and an outlet, with said inlet of said compressor assembly being in fluid communication with said suction pipeline means and said outlet of said compressor assembly being in fluid communication with said discharge pipeline means.

17. The apparatus in accordance with claim 11, further including an additional cyclic pumping assembly in fluid communication with said chamber, wherein said cyclic pumping assembly comprises a pump means having an inlet and an outlet, a suction pipeline means inserted into said agitation vessel which is connected to said inlet of said pump means and a discharge pipeline means attached to said lower distributor box means, with said lower distributor box means being connected to said outlet of said pump means, wherein said pump means provides mechanical energy for cyclic working of said cyclic liquid media.

18. An agitation apparatus comprising:
an agitation vessel having a wall defining a chamber extending along a longitudinal axis;
a heat exchange assembly, disposed in said chamber, and including a plurality of tubes arranged in rows that extend parallel to said longitudinal axis;
an agitator assembly including:
a drive shaft located within said chamber having an axis of rotation coaxially aligned with said longitudinal axis;
a drive attached to said shaft;
at least one impeller, mounted on said shaft, spaced apart from said wall defining a gap therebetween, said at least one impeller comprising a plurality of blades, each of which includes a tip, spaces apart from said wall defining a void therebetween, with said plurality of blades defining a swipe zone over which said plurality of blades travel by rotation of said impeller and an unobstructed zone defined by both said void and said gap;
upper inlet means, mounted to said agitation vessel, for introducing liquid media into said agitation vessel;
lower inlet means, mounted to said agitation vessel, for introducing liquid media into said agitation vessel;
lower outlet means, mounted to said agitation vessel, for removing liquid media from said agitation vessel;
upper outlet means, mounted to said agitation vessel, for discharging gas media from said agitation vessel,
a middle gas distributor circular tube disposed at a middle portion of said unobstructed zone;
an upper gas distributor circular tube disposed at an upper portion of said unobstructed zone; and
a plurality of static mixer assemblies independently and separately disposed in said unobstructed zone, said static mixer assemblies each including a static mixer, a flow guide being positioned between said collector and said static mixer and in communication therewith, each of said static mixer assemblies being independently and separately mounted on a support structure, with said support structure being attached to said agitation vessel, each said collector having an inlet positioned proximate to the blade tips of said impeller, with a first subgroup of said plurality of static mixers being mounted at an angle $\alpha$, a second subgroup of said plurality of static mixers being mounted at an angle $\gamma$, and a third subgroup of said plurality of static mixers are mounted at an angle $\beta$, with $\alpha$ being measured between an axis of said static mixer and a horizontal plane, $\gamma$ being measured between a horizontal projection line of said axis of said static mixer and a meridional plane containing both said longitudinal axis of said vessel and an outlet center of said static mixer, and $\beta$ being measured between said projection line and a plane perpendicular to said meridional plane at said outlet center, with a first subportion of said first subgroup being attached to said upper gas distributor circular tube with $\alpha$ being in the range of $-160°$ up to $-4°$ downward, a second subportion of said first subgroup being disposed in said middle portion, with $\alpha$ being in the range of $-160°$ up to $-4°$ downward and $4°$ up to $90°$ upward, with a sum of $\beta$ and $\gamma$ being $90°$.

19. The apparatus in accordance with claim 18, wherein said agitator includes a plurality of drive shafts, each of which has a diameter associated therewith and said at least one impeller includes a plurality of impellers, with the plurality of blades associated with each of said plurality of impellers having differing shapes and a pair of said plurality of impellers having differing numbers of blades and mounted to shafts having differing diameters.

20. The apparatus in accordance with claim 18 further including a plurality of swirler assemblies each of which has a swirler, a flow guide elbow and a collector, said collector including an inlet, with said plurality of swirler assemblies being independently and separately mounted to a support structure attached to said vessel, with said inlet of said collector being mounted proximate to one of said plurality of blades, with a first subgroup of said plurality of swirler assemblies being mounted at said angle $\alpha$, a second subgroup of said plurality of swirler assemblies being at said angle $\beta$ and a third subgroup of said plurality of swirler assemblies being at said angle $\gamma$.

21. The apparatus in accordance with claim 18 further including a cyclic inert gas compressor assembly in fluid communication with said chamber, and a gas inlet assembly, with said inert gas compressor assembly comprising a suction pipeline means, in fluid communication with said upper outlet means, a discharge pipeline means, in fluid communication with said gas inlet assembly, said compressor assembly having an inlet and an outlet, with said inlet of said compressor assembly being in fluid communication with said suction pipeline and said outlet being in fluid communication with said discharge pipeline means.

22. The apparatus in accordance with claim 18, further including an additional cyclic pumping assembly in fluid communication with said chamber including a pump means having an inlet and an outlet, a suction pipeline means inserted into said agitation vessel which is connected to said inlet of said pump means and a discharge pipeline means attached to said lower distributor box, with said lower distributor box being connected to said outlet of said pump means, wherein said pump means provides mechanical energy for cyclic working of said cyclic liquid media.

* * * * *